United States Patent [19]

Martin et al.

[11] 4,086,320

[45] Apr. 25, 1978

[54] PRODUCTION OF ALUMINUM CHLORIDE FROM RAW MATERIALS CONTAINING ALUMINUM COMPOUNDS AND SILICON COMPOUNDS

[75] Inventors: Edward S. Martin; David A. Wohleber, both of Lower Burrell, Pa.

[73] Assignee: Aluminum Company of America, Pittsburgh, Pa.

[21] Appl. No.: 780,535

[22] Filed: Mar. 23, 1977

[51] Int. Cl.$^2$ .......................... C01F 7/56; C01F 7/58
[52] U.S. Cl. ..................... 423/135; 423/136; 423/495; 423/341; 75/113
[58] Field of Search ............ 423/135, 136, 495, 137, 423/341, 343; 75/112, 113

[56] References Cited

U.S. PATENT DOCUMENTS

| | | | |
|---|---|---|---|
| 1,713,968 | 5/1929 | Lea et al. | 423/136 |
| 1,865,008 | 6/1932 | Holm | 423/136 |
| 1,875,105 | 8/1932 | Muggleton et al. | 423/136 |
| 1,878,013 | 9/1932 | Staib | 423/136 |

FOREIGN PATENT DOCUMENTS 7,008,513   12/1970   Netherlands ................ 423/136

OTHER PUBLICATIONS

Hille et al., "Angew. Chem.," vol. 72, 1960, pp. 850–855.

*Primary Examiner*—Herbert T. Carter
*Attorney, Agent, or Firm*—John P. Taylor

[57] ABSTRACT

The production of aluminum chloride from a source material containing both aluminum compounds and silicon compounds such as for example clay is improved by selective use of source materials having a surface area of at least 15 meter$^2$/gram; comminution of the source material after dehydration to a particle size of not greater than 0.6 mm (millimeters); and chlorinating the comminuted source material in the presence of a gaseous reducing agent at a temperature of at least 600° C but less than 700° C. This not only improves the rate of chlorination and improves the percentage of aluminum oxide converted to aluminum chloride but also improves the ratio of aluminum chloride to silicon chloride produced, thus producing less silicon chloride by-product which otherwise must be recirculated to the chlorination reactor or otherwise disposed of.

7 Claims, 1 Drawing Figure

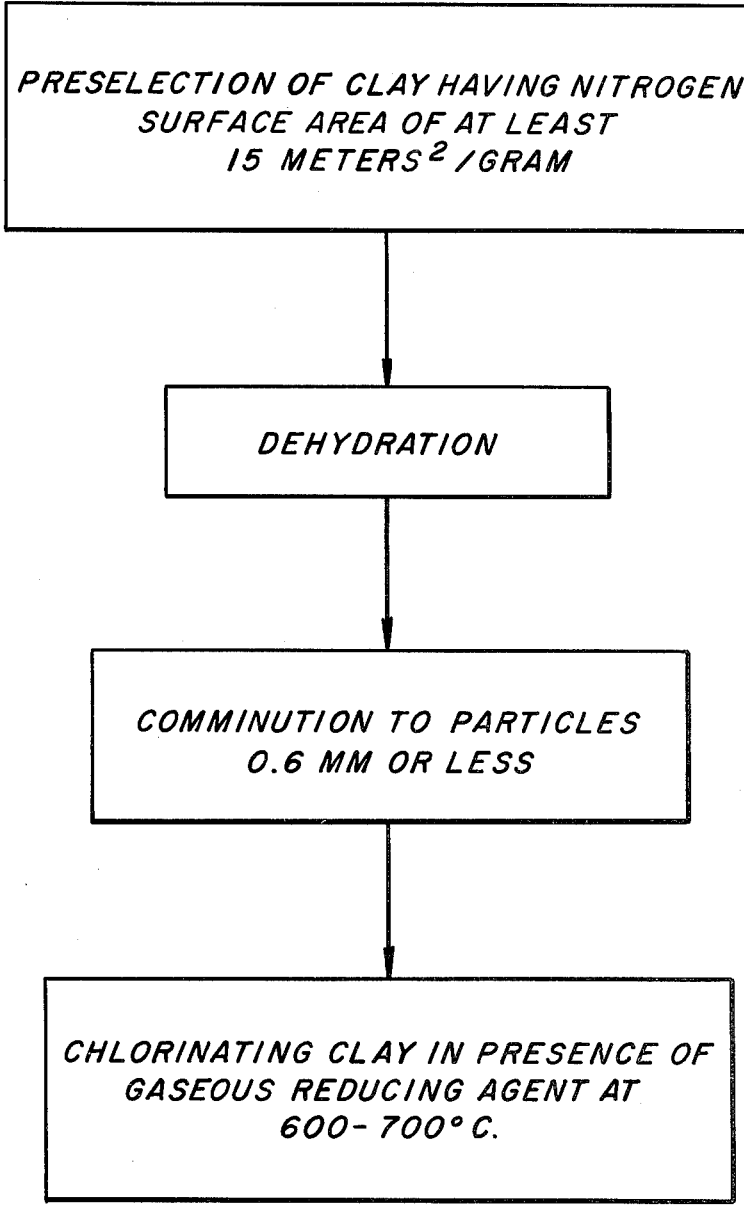

PRODUCTION OF ALUMINUM CHLORIDE FROM RAW MATERIALS CONTAINING ALUMINUM COMPOUNDS AND SILICON COMPOUNDS

CROSS-REFERENCE TO RELATED APPLICATION

This application is related to co-pending Application Ser. No. 780,534, entitled "Production of Anhydrous Aluminum Chloride from Clay Using Catalyst and Recycling of Silicon Chloride", filed concurrently herewith by the same inventors.

BACKGROUND OF THE INVENTION

This invention relates to the production of aluminum chloride. More particularly, this invention relates to the production of aluminum chloride from raw materials containing aluminum compounds and silicon compounds either physically or chemically combined.

The production of aluminum chloride for use as a Friedel-Crafts catalyst or as a feed material for the production of metallic aluminum conventionally has involved a first refinement of raw ore to recover a substantially pure aluminum oxide ($Al_2O_3$) which is then chlorinated to produce aluminum chloride. While there has been exploration of the possible chlorination of raw ores containing other impurities, this has usually been considered to be economically inferior because of the wasteful chlorination of the impurities such as silicon or the like. Furthermore, the presence of such impurities sometimes interferes with the chlorination of the aluminum compounds thus lowering the recoverable yield of the aluminum chloride from the raw material via direct chlorination.

It would therefore be valuable to have a process wherein the aluminum values in a raw material such as clay could be recovered in an economically useful percentage while at the same time inhibiting the chlorination of impurities, thus lowering the overall usage of chlorine as well as lowering the need for recycling of the impurities to recover chlorine values therefrom.

Previously it has been proposed that alumina or clay should have controlled porosity or particle size to obtain better chlorination of the $Al_2O_3$ values. For example, Staib U.S. Pat. No. 1,878,013 and German Patentschrift 531,400 teach the addition to an oxide (such as aluminum oxide) of voluminous carbonaceous matter such as peat or sawdust or the like as a reducing agent followed by drying and carbonizing to form an extremely porous body having a maximum surface of attack offered to chlorine gas. Similarly, Hille et al discuss the effect of particle size and distribution, surface area and pore size on chlorination of alumina in an article entitled "The Production of Anhydrous Aluminum Chloride from γ-Alumina in a Fluidized Bed" on pp. 850-855 of Angew Chem. 72 (1960).

While the foregoing publications discuss chlorination of oxides without necessarily addressing themselves to the presence of impurities, the chlorination of clay and the effect of the presence of $SiO_2$ therein as well as the effect of the presence of $SiCl_4$ on the chlorination of mixtures of $Al_2O_3$ and $SiO_2$ such as found in clays are discussed in Staib U.S. Pat. No. 1,866,731; British Patent Specification 305,578; and in an article by D. J. Milne entitled "Chlorination of Bauxite in the Presence of Silicon Tetrachloride" published in Metallurgical Transactions on pp. 486-488 of Volume 6B (September 1975). See also Spitzin et al "Obtaining Anhydrous Aluminum Chloride from Natural Aluminum-Containing Materials" Z. Anorg. und Allgmeine Chem. 196 pp. 289-311 (1931). Each of these publications notes that the presence of $SiCl_4$ suppresses chlorination of $SiO_2$.

There also have been investigations as to the effect of heat on the chlorination reaction particularly with regard to exothermic heat balances. See Brode et al U.S. Pat. No. 1,982,194; Wurster "Commercial Production of Anhydrous Aluminum Chloride" Z. fur Angewandte Chemie, Vol. 43, pp. 877-880 (1930); and French Pat. No. 645,335. The latter patent also commends the use of CO and $Cl_2$ over phosgene so as to generate more heat.

There seems to be little appreciation however in the above publications that maintaining the chlorination rate at a lower temperature has any effect on the selective chlorination of alumina or silica. In fact, Voronin et al in "Production of Anhydrous Aluminum Chloride from ChasovYar Clay" Zh Khim Prom 7, pp. 143-149 (1930) noted that beginning at 550° only part of the chlorine was used to chlorinate $Al_2O_3$ with the remainder used on the chlorination of $SiO_2$ and then $Fe_2O_3$ and $TiO_2$. They stated that the percentage of the total chlorine used for the chlorination of $Al_2O_3$ was independent of temperature beginning at 550° and going up to 850°. They compared their results to a previous report by Seward and Kugelhen (U.S. Pat. No. 1,147,836).

Finally, there have been favorable comments on the use of gaseous reducing agents. The Voronin et al article, referred to above, favorably reports on the use of air with solid carbon and $Cl_2$ to produce CO or phosgene which, they postulate, are better reducing agents. French Pat. No. 645,335 prefers CO over phosgene — but this again is related to a desire for sufficient production of heat to maintain a heat balance in the overall chlorination reaction.

SUMMARY OF THE INVENTION

It has now been discovered that the effects of particle size, surface area, reaction temperature and type of reducing agent are all related to production of aluminum chloride from clay while suppressing production of silicon chloride.

In accordance with the invention, it has been discovered that the source of aluminum oxide must have a nitrogen ($N_2$) surface area of at least 15 meter$^2$ per gram and must be comminuted to a particle size range of 90% by weight not greater than 0.6 mm. The particles are then chlorinated in the presence of a gaseous reducing agent at a temperature of at least 600° C but less than 700° C.

BRIEF DESCRIPTION OF THE DRAWING

The sole drawing of the invention is a flowsheet illustrating the process of the invention.

DESCRIPTION OF THE INVENTION

In accordance with the invention, aluminum chloride is produced from raw materials having an initial nitrogen ($N_2$) surface area of at least 15 meter$^2$ per gram containing aluminum compounds and silicon compounds. The materials are dried and then comminuted to a particle size of 90% by weight less than 0.6 mm in diameter and then chlorinating the dehydrated particle in the presence of a gaseous reducing agent at a temperature of at least about 600° C. In a preferred embodiment, the chlorination is carried out in the presence of a catalyst such as an alkali metal aluminum halide catalyst.

The raw materials useful in the invention include clay, such as kaolinite, anorthosite, bauxite, red mud, or any other material containing an aluminum compound particularly where the major impurity is a silicon compound. The materials must have a nitrogen surface area of at least 15 meters$^2$ per gram as determined by the B.E.T. technique and preferably at least 18 meter$^2$ per gram. The maximum surface area is not critical; nitrogen surface areas as high as 100 meter$^2$ per gram can be used. The use of a raw material having a nitrogen surface area of at least 15 meter$^2$ per gram not only results in a higher yield of AlCl$_3$ but also results in an increase in the AlCl$_3$—SiCl$_4$ ratio as well as a reduction in the attrition of the raw material.

The reducing agent, in the practice of the invention, is a gaseous reducing agent such as carbon monoxide gas, or when used in conjunction with the chlorinating agent, a compound chlorinating and reducing agent such as phosgene (COCl$_2$) may be used as both the reducing agent and the chlorinating agent.

The chlorinating agent may be chlorine gas (Cl$_2$) or as alluded to above may be a combination of the chlorinating agent with the reducing agent such as phosgene (COCl$_2$).

By way of illustration, and not of limitation, the remainder of the description will refer to dehydrated kaolinite which contains aluminum oxide and silicon oxide. The kaolinite used in accordance with the invention is initially dried at a temperature of from 100° to 400° C for about 15 minutes to 24 hrs. if the initial water content of the raw material exceeds about 15% by weight.

Following the drying step, the clay is comminuted to a particle size of substantially smaller than 0.6 millimeters. By substantially is meant at least 90% by weight and preferably 95% by weight of the particles are smaller than 0.6 millimeters, that is, at least 90% by weight and preferably 95% by weight of the particles will pass through a No. 30 sieve in the U.S. Standard Sieve Series (590 microns).

While all particles smaller than the 0.6 millimeter maximum size have been found to be superior to particles exceeding this size, the most preferred size is 0.6 to about 0.3 millimeters. Particles smaller than 0.3 millimeters show a somewhat reduced selectivity for preferential production of aluminum chloride instead of silicon chloride although still far superior to those particles having sizes above 0.6 millimeters.

The comminuted particles are then dehydrated to an LOI of 0.5% or less by roasting the particles at a temperature of from 600°–900° C for an average residence time of from 10 minutes to 4 hrs. depending upon the temperature. This removes water from the clay which reduces chlorine losses which would otherwise occur due to HCl formation by reaction of the Cl$_2$ with water.

The comminuted raw material is then chlorinated in the presence of a gaseous reducing agent at a temperature of about 600° C for an average residence time of 30–300 minutes. The gaseous reducing agent may be carbon monoxide or may be a combination material with the chlorinating agent such as phosgene (COCl$_2$). While the exact reasons why the use of a gaseous reducing agent instead of solid carbon results in a higher ratio of aluminum chloride to silicon chloride are not known, it is believed that this may be because of the higher temperature required to form aluminum chloride using a solid carbon reducing agent which in turn may accelerate the chlorination of the silica to silicon chloride. The reason for the lower reaction temperature needed for conversion of the aluminum oxide to aluminum chloride may be due to the greater mobility of the gaseous reducing agent relative to solid carbon.

As a surprising side effect, it has been found that when the reaction in run at 600° C using a gaseous reduction agent, the reaction is sufficiently exothermic to be thermally self-sustained if and when the silicon chloride produced during the reaction is recycled back to the reactor to further react with the aluminum oxide content of the raw material to produce aluminum chloride and silica according to the reaction:

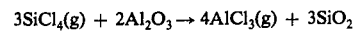

$$3SiCl_4(g) + 2Al_2O_3 \rightarrow 4AlCl_3(g) + 3SiO_2$$

In contrast, the use of carbon results in a need for a higher reaction temperature of 700° C and generates a larger amount of silicon chloride which in turn when recycled back to the reactor must be further heated to sustain the 700° C temperature in the reaction vessel. The greater amounts of recycled silicon chloride plus the higher reaction temperature thus necessitates the need for further heat values to be added to the reaction if a solid reducing agent is used.

The following examples will serve to further illustrate the practice of the invention.

EXAMPLE I

In a fluidized bed reactor of 23-24 mm ID and 340-400 mm fluidized height of bed, 70 grams of dehydrated kaolinite were reacted with phosgene in the presence of 5% potassium aluminum chloride catalyst. The phosgene was passed through the bed at a rate of 2.13 kilogram moles of COCl$_2$ per hour per m$^2$ of reactor cross-section. Various size ranges of the particles were used and in all instances the run was made over at least 2 hours. However, with some of the very large particles, the total run time was extended because of the poor results obtained during the first 2 hours of chlorination. In each case, the amount of aluminum chloride produced during the first 2 hours of chlorination was observed by recovery of the aluminum chloride gas evolved and recovered by condensation from the gas stream coming out of the reactor. In all instances, the percentage of aluminum oxide recovered as aluminum chloride during the total reaction was also calculated by a first determination of the total amount of aluminum oxide in the 70 gram sample and comparing this to the total amount of aluminum chloride recovered from the reactor during the reactor run. The results are listed in Table I. These results clearly indicate a marked difference in the amount of aluminum chloride produced in a 2-hour chlorination period as well as the percentage of aluminum oxide converted to aluminum chloride and the ratio of AlCl$_3$ to SiCl$_4$ when particle sizes of less than 0.6 millimeters are used. It should be noted here that this ratio declines as the particle size range drops down to below 0.3 and further as the particle size drops below 0.15 millimeters. However, in all of the below 0.6 mm ranges, the ratio and the yield are still considerably higher than the ratio experienced when using particle sizes of greater than 0.6 mm, thus indicating a distinct advantage in the production of lesser amounts of undesirable silicon chloride which must be either recycled to the chlorinator or otherwise disposed of in a manner in which the chlorine values can be recovered from the chlorinated silica.

verted to aluminum chloride was calculated as well as the percentage of silicon oxide converted to silicon

TABLE I

INITIAL REACTION RATE, RECOVERY AND MOLE RATIO $AlCl_3/SiCl_4$ IN CHLORINATION REACTOR PRODUCT AS A FUNCTION OF PARTICLE SIZE

| Size Range | Total Run Time | $AlCl_3$ Produced in First 2 hours of Chlorination (grams) | % $Al_2O_3$ in Clay Recovered as $AlCl_3$ - Total Time | Mole Ratio $AlCl_3/SiCl_4$ for Run |
|---|---|---|---|---|
| 4.76–3.36 mm | 4 hrs | 34.4 | 72.6 | 0.92 |
| 3.36–2.38 mm | 3 hrs | 41.3 | 68.4 | 1.11 |
| 2.38–1.68 mm | 2 hrs | 44.2 | 58.7 | 1.34 |
| 0.841–0.595 mm | 2 hrs | 42.0 | 58.8 | 1.04 |
| 0.595–0.297 mm | 2 hrs | 66.5 | 88.6 | 3.01 |
| 0.297–0.210 mm | 2 hrs | 64.3 | 85.6 | 2.34 |
| 0.149–0.105 mm | 2 hrs | 62.2 | 82.7 | 1.82 |

Chlorination Conditions: 70 gm sample of dehydrated kaolin + 5 wt % $KAlCl_4$ (3.5 gm), 600° C, 2.13 kg mole $COCl_2$/$m^2$ – hr

EXAMPLE II

To illustrate the advantage of recycling back $SiCl_4$ produced in the chlorination reaction and the particle size dependency of this, various particle size 70-gram kaolin charges were chlorinated, as in Example I, with $COCl_2$ in the presence of 5% by weight of the clay charge $KAlCl_4$ catalyst but with $SiCl_4$ gas added to the $COCl_2$ gas in an amount equal to the $SiCl_4$ produced.

chloride. In each case, the total amount of silicon chloride produced was recycled back to the reactor to provide an additional source of chlorine for the further chlorination of aluminum oxide. The results are shown in Table III. In comparison to the results shown in Table II of Example II the ratio of $AlCl_3$ to $SiCl_4$ produced was much lower (for comparable size particles) except in the first sample where no $SiCl_4$ was recycled back to the chlorination stream.

TABLE III

CHLORINATION OF DEHYDRATED CLAY-LIGNITE CARBON AGGLOMERATES COMPARISON OF BEHAVIOR WITH $Cl_2$ AND $Cl_2$ + $SiCl_4$ MIXTURES

| Sample | Agglomerate Size Range, mm. | %C in Agglomerates | Charge, gm. | Gas Flows, mole/hr. $Cl_2$ | Gas Flows, mole/hr. $SiCl_4$ | %$Al_2O_3$ In Clay Converted to $AlCl_3$ | %$SiO_2$ In Clay Reacted | Mole Ratio $AlCl_3$ Total $SiCl_4$ | % Carbon Reacted | Average $CO_2$/ CO + $COCl_2$ |
|---|---|---|---|---|---|---|---|---|---|---|
| 1 | 0.6/0.30 | 14.4 | 60.0 | 0.75 | — | 89.7 | 21.6 | 3.09 | 74.6 | 2.19 |
| 2 | 0.6/0.3 | 14.4 | 60.0 | 0.59 0.59 | 0.088 0.054 | 53.3 | 26.0 | 0.75 | 23.6 | 2.04 |
| 3 | 0.30/0.10 | 11.8 | 60.0 | 0.75 | — | 78.5 | 41.3 | 1.42 | 61.6 | 2.13 |
| 4 | 0.30/0.10 | 11.8 | 80.0 | 0.59 0.59 | 0.053 0.100 | 83.8 | 30.3 | 1.08 | 72.4 | 1.30 |
| 5 | 0.21/0.10 | 10.2 | 70.0 | 0.75 | — | 77.5 | 32.2 | 1.84 | — | 5.30 |
| 6 | 0.21/0.10 | 10.2 | 80.0 | 0.59 | 0.211 0.198 | 71.3 | 6.6 | 0.86 | 70.7 | 1.48 |

The results in Table II clearly show the advantage of recycling the $SiCl_4$ back to the chlorination zone particularly when kaolin particle sizes under 0.6 mm are used.

EXAMPLE IV

To illustrate the effect of nitrogen surface area on the chlorination reaction, particularly the percentage of

TABLE II

CHLORINATION OF DEHYDRATED TEXAS CLAY EFFECT OF $SiCl_4$ ADDITION TO THE CHLORINATION GAS

| Sample | Particle Size Range, mm. | Clay Charge, gm. | Reaction Time, hr. | Gas Feed Rates, gm-mole/hr. $COCl_2$ | Gas Feed Rates, gm-mole/hr. $SiCl_4$ | %$Al_2O_3$ in Clay Chlorinated (recovered as $AlCl_3$) | %$SiO_2$ in Clay Chlorinated | Mole Ratio $AlCl_3$ Total $SiCl_4$ |
|---|---|---|---|---|---|---|---|---|
| 1 | 4.76/3.36 | 70 | 1 2 | 0.75 0.75 | 0 0 | 44.8 | 39.4 | 0.92 |
| 2 | 4.76/3.36 | 70 | 1 2 | 0.60 0.60 | 0.167 0.169 | 43.5 | 21.0 | 0.50 |
| 3 | 1.68/0.84 | 70 | 1 2 | 0.60 0.60 | 0.118 0.126 | 40.2 | 28.4 | 0.50 |
| 4 | 0.6/0.3 | 70 | 1 2 | 0.60 0.60 | 0.052 0.065 | 80.7 | 10.7 | 2.30 |
| 5 | 0.30/0.21 | 70 | 1 2 | 0.60 0.60 | 0.072 0.068 | 74.0 | 6.4 | 2.19 |

EXAMPLE III

To illustrate the invention, with respect to the use of a gaseous reduction agent instead of a solid, 70 grams of clay particles having a particle size range of 0.6 to 0.3 millimeters were contacted with chlorine gas at a temperature of 700° C in the presence of various amounts of solid carbon in the presence of 5% by weight of the clay charge $KAlCl_4$. The percent of aluminum oxide con- $Al_2O_3$ in the raw material recovered as $AlCl_3$; the ratio of $AlCl_3$ to $SiCl_4$; and the attrition as measured by the amount of dust generated, various clays were comminuted to a particle size of 0.42–0.21 millimeters and chlorinated in 70 gram samples for 2 hours at 600° C with 0.75 moles per hour of $COCl_2$ in the presence of 5 percent by weight of the clay charge $KAlCl_4$ catalyst. The results are shown in Table IV.

TABLE IV

CHLORINATION OF RAW MATERIAL AS A FUNCTION OF SURFACE AREA

| Sample | Surface Area meter$^2$/gram | %Al$_2$O$_3$ in Raw Material Recovered as AlCl$_3$ | Mole Ratio AlCl$_3$/SiCl$_4$ | Dust as % of Orig. Wt. Material Charged |
|---|---|---|---|---|
| A | 20 | 82.7 | 2.71 | —** |
| B | 18 | 83.0 | 3.16 | — |
|   |    | 81.9 | 2.96 | — |
| C | 20 | 80.4 | 3.14 | — |
| D* | 11 | 57.4 | 1.33 | 2.9 |
| E | 10 | 44.2 | 0.88 | 3.3 |
| F | 19 | 84.4 | 3.30 | 0.3 |
| G | 24 | 91.7 | 2.20 | — |

*0.30–0.10 mm particles instead of 0.42–0.21 mm
**The amount of dust collected was too small to measure

Having thus described our invention, what is claimed is:

1. An improved process for the selective production of aluminum chloride by the chlorination of a source material containing both aluminum compounds and silicon compounds while inhibiting production of silicon chloride which comprises:
   a. selecting a source material which has a surface area of at least 15 meters$^2$ per gram;
   b. comminuting the source material to a particle size of 90% by weight not greater than 0.6 millimeters;
   c. dehydrating the comminuted source material by roasting it at a temperature of 600° to 900° C for a period of 10 minutes to 4 hours;
   d. chlorinating the comminuted source material with a chlorinating agent in the presence of a gaseous reducing agent at a temperature of at least 600° C but less than 700° C; and
   e. separating aluminum chloride from said chlorinated source material.

2. The process of claim 1 wherein said source material is kaolin clay.

3. The process of claim 1 wherein said gaseous reducing agent is selected from the class consisting of CO and COCl$_2$.

4. The process of claim 1 wherein said surface area is from 15–100 meter$^2$ per gram.

5. The process of claim 1 wherein said particle size is from 0.6 to 0.1 millimeters.

6. The process of claim 5 wherein said particle size is from 0.6 to 0.3 millimeters.

7. The process of claim 1 wherein said chlorination is carried out for an average residence time of from 30 to 300 minutes.

* * * * *

UNITED STATES PATENT AND TRADEMARK OFFICE
CERTIFICATE OF CORRECTION

PATENT NO. : 4,086,320
DATED : April 25, 1978
INVENTOR(S) : Edward S. Martin et al It is certified that error appears in the above–identified patent and that said Letters Patent are hereby corrected as shown below:

In the Drawing:

Move the "DEHYDRATION" step to after the step entitled: "COMMINUTION TO PARTICLES 0.6MM OR LESS".

Col. 2, Line 19    Change "ChasovYar" to ----Chasov-Yar----.

Col. 4, Line 8    Change "in" to ----is----.

Signed and Sealed this

Tenth Day of October 1978

[SEAL]

Attest:

RUTH C. MASON
*Attesting Officer*

DONALD W. BANNER
*Commissioner of Patents and Trademarks*